UNITED STATES PATENT OFFICE.

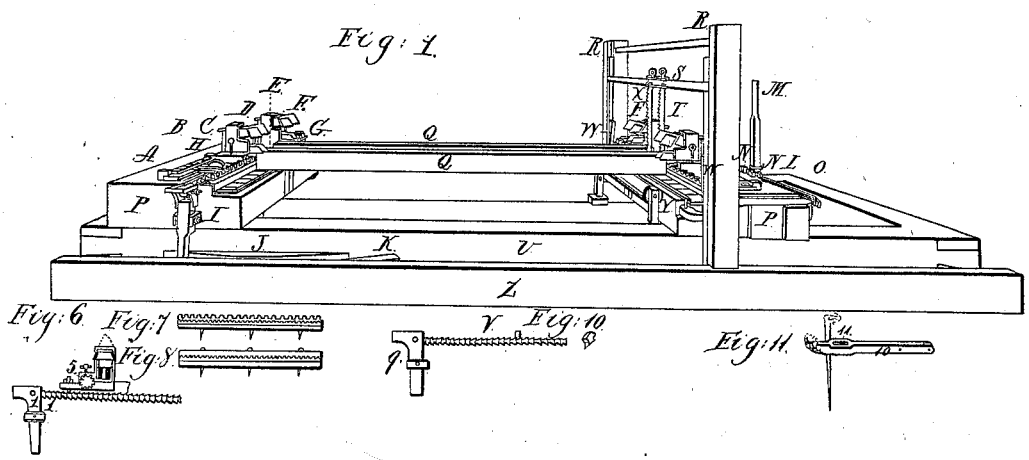

GEORGE HENNING, OF ITHACA, NEW YORK.

SELF-SETTING COG FOR SAWMILLS.

Specification of Letters Patent No. 2,531, dated April 1, 1842.

*To all whom it may concern:*

Be it known that I, GEORGE HENNING, of the village of Ithaca, county of Tompkins, and State of New York, have invented a new and useful Improvement on the Self-Setting Sawmill-Dog Blocks; and I do hereby declare that the following is a full, clear, and exact description of the construction and operation of the same, reference being had to the annexed drawings, making a part of this specification, in which—

Figure 1 is a perspective view of the whole machine; Fig. 2, a perspective view of the head block; Fig. 3, a longitudinal section of the tail block, and Figs. 4, 5, 6, 7, 8, 9, 10, and 11 are views of separate parts of the machine.

In the perspective view of the whole machine, Fig. 1, letter Z, represents the floor of the sawmill, on which the carriage U, moves; the carriage marked letter U, is similar to an ordinary sawmill carriage and supports the blocks at both ends marked P, also like common saw mill blocks; the letter A, is a perpendicular lever twelve inches long, three inches wide at the top, and tapering to one inch at the bottom; in the top of the perpendicular lever A is a horizontal aperture, large enough to admit the square or hexagon end of the iron rod with series of notches as shown in the separate view, Fig. 9; seven inches from the bottom of the perpendicular lever A, is the fulcrum I, supported by an iron driven into the end of the block P.

Letter B, is an iron rod two feet five inches long, one and one-half inches diameter, with a square or hexagon end two inches in diameter; through each side of the square or hexagon end is a hole to receive the bolt by which it is fastened in the aperture in the top of the perpendicular lever A; the rest of the rod B, is either square or hexagon and notched like the teeth of a saw mill saw, with the perpendicular edge of the notch facing from the perpendicular lever A, so that the little dog C, hereafter described, cannot slip over the notches when the iron rod with sizes B, is thrown in toward the center of the block P; the notches in the iron rod with sizes B, are intended to make sizes for the lumber to be sawed.

Letter E, is a slide twelve inches long and five or six inches wide with an upright upon it ten inches high and four or five inches wide in which is an aperture to receive the large dog F; at each end of the slide is a perpendicular aperture large enough to receive the small perpendicular dog C; the upper edges of the slide E, are beveled to a miter, so that the top of the slide E is narrower than the bottom.

The letter C, is a small perpendicular dog (of which Fig. 10 represents the shape) two inches wide at bottom, three inches high and one inch thick, the lower end beveled to a miter; the small dog C, is placed loose in the perpendicular apertures of the slide E, rests in the notches of the iron rod with sizes B, with the perpendicular side of the dog toward the perpendicular lever A and against the perpendicular edge of the notch, so that the oblique side of the dog will slip over the notches one way and the straight side hold fast the other.

The letter F, represents a large cast iron dog ten inches long, three inches thick and suitable to enter the aperture in the upright on the slide E, with teeth to hold the log; a wedge is driven on the top of the dog to hold it in the upright.

The letter D, is a box part of the slide E, in which is a friction roller eight inches long and three inches in diameter; the ends of the roller are cogged like a miter wheel and fit into corresponding cogs in the guides G and H.

The letter G, is a front guide to the slides E, is two feet four inches long, with beveled edge, the upper edge with cogs for the friction roller to work in, the lower edge of the guide G beveled so as to fit the beveled edge of the slide E; the guide G, is so constructed as to form the step of the block P, to which it is fastened with bolts.

The letter H, is the back guide to the slides E, and is five feet long, two and a half inches wide and one and a half inches thick, beveled and cogged in the same manner as the guides G; the guide H, is fastened by three bolts passed into the block P, behind the guide, the bolts having clamps which project over the guide H, and are sunk into it so as to hold it down, space being left between the guide H and the bolts to insert small wedges by which the guide is driven against and tightens the slide E.

The letter J, is a perspective view of a block of wood two inches thick fastened to the floor of the saw mill (also represented by Fig. 4) forming an isosceles triangle four inches wide from the vertex to the base and four feet long, the base resting against the carriage and the part of the block from the carriage (being the equal angles) faced with iron; the block J is so placed that when the carriage runs back preparatory to sawing the lower part of the perpendicular lever A, strikes the block J, at the acute angle nearest the saws and is pushed directly from the carriage as the carriage pushes the perpendicular lever A along the cast iron face of the block J, to the vertex of the triangle, which throws toward the block P, the upper end of the perpendicular lever A.

The letter K, is a perspective view (also represented in Fig. 5) of a movable block of wood fastened at the end farthest from the saw to the floor by a bolt on which it moves as a pivot, the wedge represented in Fig. 5, on which are the figures $\frac{1}{2}$, 1, 2, 3, 4, is two inches thick in the shape of an isosceles triangle the base three inches and the wedge twelve inches long, the figures on the wedge indicate the distance the wedge is to be inserted between the movable block K, and a stationary piece of timber represented in Fig. 5, by the lines below the wedge, the block K, is so placed upon the floor of the saw mill that as the carriage moves in sawing the lower end of the perpendicular lever A, comes in contact with the block K, on the side nearest the carriage and near the pivot on which the block moves and the perpendicular lever A, is pushed toward the carriage as it passes along the face of the block K, which throws from the block P, the upper end of the perpendicular lever A.

The head block is constructed like the tail block except in the following particulars; the cogs in the back guide terminate at the saws and indentations two inches deep are made to receive the back part of the saws, the iron rod with sizes B, is attached to a horizontal lever L, twenty four inches long two inches thick swelling for six or eight inches then tapering to one inch at the end where the iron rod O, is attached, six inches from the thick end of the horizontal lever L is an aperture to receive the end of the iron rod with sizes B, which is fastened by a bolt, the horizontal lever L, moves horizontally on a fulcrum eight inches from the small end of the lever.

The letter O, in the perspective view of the head block, Fig. 2, is a small iron rod attached at one end to the small end of the horizontal lever L, and at the other to the top of a small perpendicular lever N; the perpendicular levers N, are about two inches square and twelve inches long, six inches from the lower end of the perpendicular levers N, is a bolt driven into the back of the block P, at right angles with the block and through the perpendicular levers N, on which they move as a fulcrum.

The letters A, A, represent two triangular blocks two inches thick two feet long and three inches wide at the base, moving on pivots represented by dots near the vertex of the angle, between which blocks is the wedge marked with the figures $\frac{1}{2}$, 1, 2, 3, 4, which is twelve inches long and three inches wide at the large end, used in the same manner and for the same purpose as the wedge represented in Fig. 5; the block A, A, is so placed upon the floor of the mill that when the head block passes over it in sawing the lower ends of the perpendicular levers N, strike the sides of the block near the vertex of the angle and are pushed outward as they pass toward the large end of the block, so that the upper ends of the perpendicular levers N, and the small ends of the horizontal levers L, are drawn toward the center, and the iron rod with sizes B, drawn out.

R, represents ports for a saw gate, S, a saw gate and T, two saws all constructed in the usual manner. W, represents a perpendicular wedge fastened to a part of the saw gate projecting at the top two inches and tapering for 18 inches to the saw gate, or, instead of the wedge a block similar in shape to block J, may be fastened to a made part of the saw gate being two inches across from the vertex of the angle to the base faced with cast iron and tapering up and down to the saw gate the length of eighteen inches each way, the wedges or blocks W, in descending with the saw gate strike the outside of the horizontal levers L and throw the levers L, and the iron rod with sizes B, toward the center of the block P; when the wedges W, are not desired to be used then the iron rod O, may be removed from the lever N, and fastened to the large perpendicular lever M, which is thirty six inches long and two inches square, and the bolt which is used as a fulcrum to the horizontal lever L taken out and run through at the large end of the horizontal lever L, to act as a fulcrum and the large perpendicular lever M, may be used by hand; the large cogs in Fig. 1, on the step of the blocks are constructed in the usual manner and are to receive the crow bar in moving the log.

"The improved double self setting saw mill dog blocks" are, as represented in Fig. 1, intended for two saws, but may be used for one saw or may be made single; the upright on the slide E, at the head end is placed at the end of the slide next the saw, and the slide E has one or more perpendicular apertures on the other end of the side to receive the small dog C; the notches on one side of the iron B, are $\frac{1}{2}$ inch apart, on the next side $\frac{1}{8}$ inch farther apart, and on the next $\frac{1}{4}$ inch farther apart and so on.

The operation of the machine is as follows: The legs are rolled on the blocks P, and slatted, then made fast by the dogs F, as the carriage moves in sawing the lower end of the perpendicular lever A, at the tail end of the carriage passing by the block J, strikes the block K, near the pivot on which the block K, moves, and is pushed toward the carriage as the lever moves along the face of the block K. This throws out from the carriage the top of the lever A, draws out the iron rod with sizes B, and permits the little dog C, to pass over one or more notches (according as the block K, is set) and drop down with its perpendicular edge against the perpendicular edge of the notch in the iron rod with sizes B; by which operation the tail end is prepared to set the log for the next sawing; at the same time that the tail end is preparing to set the head block passes over the blocks A, A, and the lower ends of the levers N, are brought in contact with the triangular blocks A, A, near the vertex of the angle and passing along the face of the blocks are thrown out from the center which drawing the top of the perpendicular levers N, and the small end of the horizontal lever L toward the center of the block P, throws from the block P the large end of the horizontal lever L, draws out the iron rod with sizes B, and permits the small dog C, to pass over one or more notches (according as the blocks A, A, are set) and drop down with its perpendicular edge against the perpendicular edge of the notch in the iron rod with sizes B, by which operation the head end is prepared to set the log for the next sawing; after the board is sawed, as the carriage passes back the lower end of the lever A strikes the end block J, at the acute angle nearest the saws and is pushed directly from the carriage in its rise to the vertex of the triangle block J which throws toward the block P the upper end of the perpendicular lever A which pushes the iron rod with sizes B toward the center of the block P; the perpendicular dog or dogs C being fast in the notches of the iron rod with sizes B is carried along with the rod and pushes with it the slide E which supports the upright in which the large F are placed; sets the tail end of the log, while the cogs of the friction roller D fitting into corresponding cogs in guides G and H, serve to steady the slide; when the carriage has passed back and is prepared to commence sawing the first stroke of the saw gate before the saw strikes the log carries the wedges W which are attached to the saw gate against the outer side of the horizontal lever L which throws them toward the center of the block P, and pushes the iron rod with sizes B toward the center of the block P, setting the log in the same manner as at the tail end; the thickness of the board to be sawed is regulated by the wedges on which is marked the figures $\frac{1}{2}$, 1, 2, 3, 4 by pushing in or drawing out the wedges to the size to be sawed.

What I claim as my invention and desire to secure by Letters Patent is—

1. I claim on the head block the combined levers N N iron rod O horizontal lever L iron rod B with the series of notches and the small dog and slide in combination with the wedge pieces or blocks A A on the floor of the mill and the wedge pieces W on the saw gate for the purpose and in the manner specified.

2. I also claim on the tail block the combined lever A iron rod B with the series of notches and the small dog and slide in combination with the wedges or blocks J and K on the floor of the mill for the purpose and in the manner specified.

3. I also claim as my invention the application of the friction rollers D to the guides G and H for the purpose and in the manner specified.

GEO. HENNING.

Witnesses:
J. H. LECKLEY,
LEWIS SCOTT.